(12) United States Patent
    Nelson

(10) Patent No.: US 9,174,742 B2
(45) Date of Patent: Nov. 3, 2015

(54) ASSISTANCE WITH PILOTING OF AN AIRCRAFT IN A STALL

(71) Applicant: Airbus (SAS), Blagnac (FR)

(72) Inventor: Harry Nelson, Pibrac (FR)

(73) Assignee: Airbus (SAS), Blagnac (FR)

( * ) Notice: Subject to any disclaimer, the term of this patent is extended or adjusted under 35 U.S.C. 154(b) by 0 days.

(21) Appl. No.: 14/093,197

(22) Filed: Nov. 29, 2013

(65) Prior Publication Data

US 2014/0156116 A1 Jun. 5, 2014

(30) Foreign Application Priority Data

Nov. 30, 2012 (FR) ...................................... 12 61446

(51) Int. Cl.
    G06F 7/70 (2006.01)
    B64D 43/02 (2006.01)
    G01C 23/00 (2006.01)
    G05D 1/06 (2006.01)

(52) U.S. Cl.
    CPC ................ *B64D 43/02* (2013.01); *G01C 23/00* (2013.01); *G01C 23/005* (2013.01); *G05D 1/0607* (2013.01)

(58) Field of Classification Search
    CPC .... G01C 23/005; G01C 23/00; G08G 5/0021; G08G 5/045; B64D 43/00; B64D 2045/0055; B64D 45/0015

USPC .......... 701/14; 340/945, 963, 438, 691.3, 973
See application file for complete search history.

(56) References Cited

U.S. PATENT DOCUMENTS

| | | | | |
|---|---|---|---|---|
| 2,892,180 | A | * | 6/1959 | Smith ........................... 340/975 |
| 3,686,936 | A | * | 8/1972 | Daudt, Jr. ........................ 73/180 |
| 4,910,513 | A | * | 3/1990 | Kelly et al. .................... 340/966 |
| 5,056,471 | A | * | 10/1991 | Van Husen .................. 123/51 R |
| 5,067,667 | A | * | 11/1991 | Shivers, Jr. ................... 244/1 R |
| 2001/0002817 | A1 | * | 6/2001 | Berlioz et al. ................ 340/978 |
| 2003/0048203 | A1 | * | 3/2003 | Clary et al. ................... 340/945 |
| 2003/0193411 | A1 | * | 10/2003 | Price ............................. 340/973 |
| 2011/0172855 | A1 | * | 7/2011 | Marstall et al. .................... 701/9 |
| 2011/0205090 | A1 | * | 8/2011 | Marstall et al. ............... 340/975 |

FOREIGN PATENT DOCUMENTS

| | | |
|---|---|---|
| EP | 0224278 | 6/1987 |
| EP | 0545473 | 6/1993 |

OTHER PUBLICATIONS

French Search Report, Oct. 4, 2013.

\* cited by examiner

*Primary Examiner* — Helal A Algahaim
*Assistant Examiner* — Shardul Patel
(74) *Attorney, Agent, or Firm* — Greer, Burns & Crain, Ltd.

(57) ABSTRACT

An intuitive display including a visual representation of a maximum admissible angle of attack on a pitch scale giving the crew of an aircraft a visual recognition of an imminent stall, or of a stall, together with real assistance with piloting during the stall until the aircraft has come out of the stall completely.

11 Claims, 7 Drawing Sheets

ASSISTANCE WITH PILOTING OF AN AIRCRAFT IN A STALL

CROSS-REFERENCES TO RELATED APPLICATIONS

This application claims the benefit of the French patent application No. 12 61446 filed on Nov. 30, 2012, the entire disclosures of which are incorporated herein by way of reference.

BACKGROUND OF THE INVENTION

The present invention relates to the field of on-board methods and systems to assist piloting of an aircraft and, more specifically, to alert the crew that a stall is imminent, and to assist them to control the aircraft.

Stalling consists of a sudden loss of lift of the aircraft which may be due to a very high angle of incidence (or angle of attack) between the chord line of a wing and the aircraft's speed vector. More specifically, when the pitch angle increases the angle of attack increases, lift increases, and the flow over the top surface of a wing starts to separate in the area of the trailing edge. When the angle of attack reaches a critical value (called the stall value), which depends on the wing's characteristics, an air flow separation may occur on the top surface of the wing, leading to a loss of lift.

Each wing generally has a sensor (for example, a tongue positioned on the edge of the wing) to measure the current value of the angle of attack. The measurement is transmitted to an indicator on the instrument panel giving the current value of the angle of attack.

In addition, when the angle of attack begins to come close to the stall value, the angle of attack measurement sensor activates cabin alerts of a visual, and/or acoustic and/or tactile (stick vibration) type. The pilot then pushes the stick to regain an angle of attack which is lower than the stall value.

The various alerts thus enable the crew to remedy the situation in order that the aircraft does not stall. However, these alerts do not provide assistance with piloting to facilitate re-establishment of control of the aircraft.

In addition, the crew does not have precise indications enabling them, if required, to increase lift fully without exceeding the stall angle of attack.

The object of the present invention is to propose a system and method to assist piloting which is simple, intuitive and accurate, remedying the abovementioned disadvantages, and in particular providing the crew with visual detection means which are easy to interpret, in order not to enter into a stall, and a real system to assist piloting in order to control the aircraft in stall situations.

SUMMARY OF THE INVENTION

The present invention is defined by a method to assist piloting of an aircraft, according to which a trajectory pointer representing a current flight trajectory vector and a pitch pointer indicating a current pitch angle value are shown on a pitch scale of a display screen, where the method includes the following steps:
  determining a pitch angle limiting value representative of a maximum admissible angle of attack, depending on a set of flight parameters and aircraft configurations, and
  displaying on the said pitch scale of the display screen a maximum angle of attack pointer indicating the pitch angle limiting value.

This method enables the pilot to detect rapidly and visually that a stall is imminent or commencing, and enables them to control the aircraft directly in relation with the pitch angle in order to come out of the stall and to re-establish the altitude accurately without any secondary stalling.

According to a particular embodiment of the present invention, the maximum angle of attack and trajectory pointers form upper and lower limits, respectively, of a dynamic safety envelope representative of a normal flight of the aircraft.

The dynamic envelope thus provides a visual margin of safety which is easy to interpret. More specifically, the pilot can be sure that the aircraft is in normal flight provided the pitch pointer is within the envelope, and can rapidly detect that a stall is imminent if the pitch pointer approaches the upper limit of the envelope. In addition, the dynamic envelope enables the pilot to come out of a stall situation while taking maximum advantage of the pitch safety margin in order to recover an initial altitude accurately without exceeding the maximum angle of attack.

The relative position and/or the extent of the dynamic envelope relative to the pitch scale change as the flight parameters, including the Mach number and the pitch rate, change, and as the aircraft configurations change.

This allows real-time detection that a stall is imminent.

As an example, the said dynamic envelope is a rectangle the upper and lower sides of which are formed by the maximum angle of attack and trajectory pointers, respectively, thus giving the pilot simple and intuitive visual detection means.

It will be noted that in a normal flight situation the said maximum angle of attack pointer or of the said dynamic envelope are advantageously displayed at the pilot's request. This gives the pilot freedom to choose, or not to choose, to display the dynamic envelope, in order not to overload the display screen.

The said maximum angle of attack pointer or the said dynamic envelope is advantageously displayed automatically as soon as the aircraft begins to stall. This enables the pilot to be alerted that a stall is imminent, even if the display of the dynamic envelope has not been preselected by the pilot. In addition, the display of the said maximum angle of attack pointer or of the said dynamic envelope continues after the aircraft has come out of the stall, and until it is dismissed by the pilot.

The display of the maximum angle of attack pointer or of the said dynamic envelope is advantageously shown using different colors, including a first color representing a normal flight situation, a second color representing a situation where a stall is imminent, and a third color representing a stall. This enables the pilot to distinguish, rapidly and intuitively, between the situation where a stall is imminent, the situation of stalling, and the situation of coming out of a stall.

The stall is advantageously accompanied by a display of directional arrows pointing in the direction from the pitch pointer towards the interior of the said dynamic envelope. This helps the pilot to recover control of the aircraft by indicating to him that he should reduce the pitch angle to bring it back within the safety margin defined by the dynamic envelope.

The method advantageously includes the display of roll control signals to re-establish the lateral stability of the aircraft after it comes out of the stall, or when the aircraft is not in a stall.

This enables the pilot to be guided in their roll maneuvers, provided the pitch pointer is already within the dynamic envelope.

The roll control signals may advantageously include arrows shown in different colors and/or sizes and/or which are flashing, depending on whether the operation to return to horizontal flight is accomplished in the correct or the incorrect direction. More specifically, this enables the pilot's attention to be attracted in the event that the operation to return to horizontal flight is being undertaken in the incorrect direction.

The method advantageously includes the display on the display screen of a replacement speed scale in the event that a habitual speed indicator malfunctions.

The invention also relates to a system to assist piloting of an aircraft, including a display screen showing a pitch scale, a trajectory pointer representing a current flight trajectory vector and a pitch pointer indicating a current pitch angle value, including:
- calculation means to determine a pitch angle limiting value representative of a maximum admissible angle of attack, depending on a set of flight parameters and aircraft configurations, and
- calculation means to display on the said pitch scale of the display screen a maximum angle of attack pointer indicating the pitch angle limiting value.

The invention also relates to an aircraft including a system to assist piloting according to the above characteristics.

DETAILED DESCRIPTION OF PARTICULAR EMBODIMENTS

Figure 1:
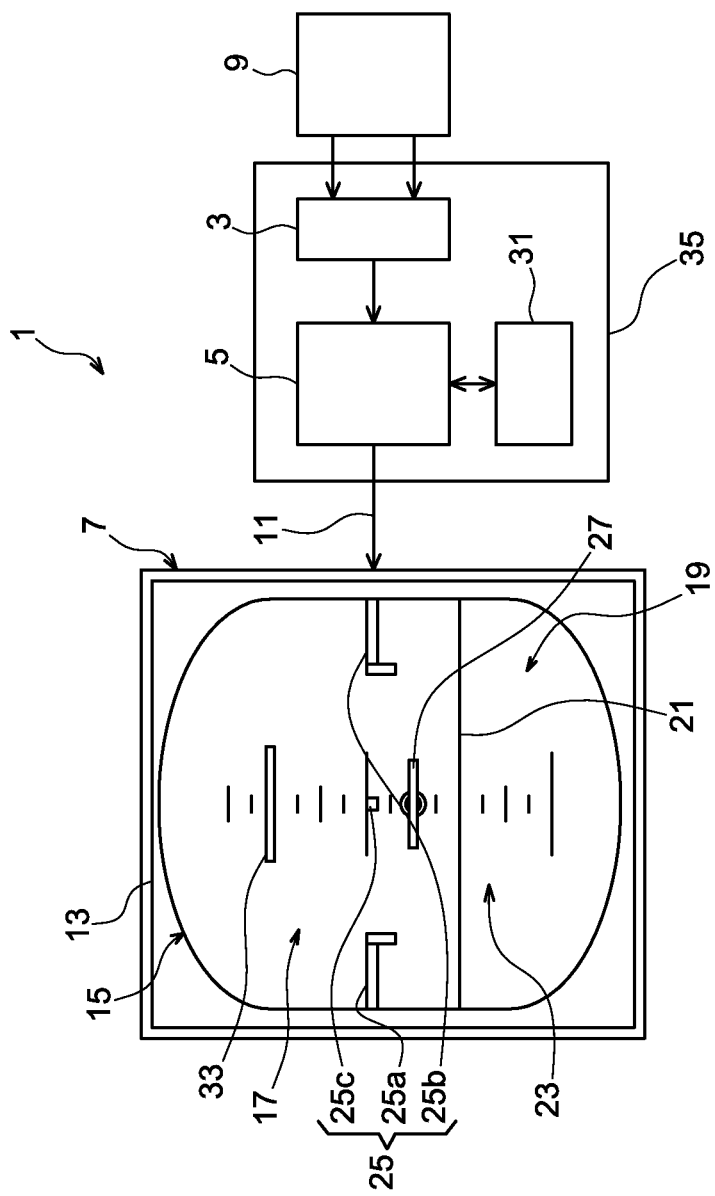
FIG. 1 illustrates schematically an on-board system to assist piloting of an aircraft, according to the invention.

FIG. 1 illustrates schematically an on-board system to assist piloting of an aircraft, according to the invention. It will be noted that this figure is also an illustration of the method to assist piloting, according to the invention.

On-board system 1 to assist piloting includes acquisition means 3, processing means 5 and interface means 7.

Acquisition means 3 are configured to acquire measurements or data from a set 9 of sensors and/or aircraft control computers, relative to a set of flight parameters and configurations of the aircraft. The set of flight parameters includes, for example, the speed of the aircraft relative to the air, the Mach number, the mass of the aircraft, the density of the air, the load factor, the lift gradient, the angle of attack, etc., while the configurations of the aircraft include, for example, the position of the flaps or other flight controls.

Processing means 5 use the data acquired by acquisition means 3 to determine in a habitual manner the roll and pitch angles, the speed vector of the aircraft, and other data of use for the crew.

Acquisition means 3 and processing means 5 are connected via connection means 11 to interface means 7, which include a piloting indicator or screen 13 of the PFD (Pilot Flight Display) type which is already present on board the aircraft.

On a display screen 15 of the PFD the attitude or trim of the aircraft relative to an artificial horizon is generally displayed.

The traditional display includes an upper portion 17 and a lower portion 19, separated by an artificial horizon line 21. Upper portion 17 is generally colored blue to represent the sky, and other portion 19 brown to represent the earth. Horizon line 21 is also used as a roll angle indicator relative to roll graduations (not represented) present on the perimeter of the display screen.

The display on display screen 15 also includes graduations 23 either side of horizon line 21 forming a pitch scale 23, together with a pitch pointer 25, indicating the current pitch angle value. Pitch pointer 25 generally includes first and second L-shaped elements 25a, 25b either side of a central element 25c acting as a needle to indicate the pitch angle. The display also includes a trajectory pointer 27 measuring on pitch scale 23 the direction of a current flight trajectory vector relative to horizon line 21. Trajectory pointer 27 generally has the form of a very simplified aircraft model.

In accordance with the invention, system 1 to assist piloting includes calculation means 31 to determine a pitch angle limiting value representative of a maximum admissible angle of attack. In addition, the display on display screen 15 includes a maximum angle of attack pointer 33 indicating on pitch scale 15 the pitch angle limiting value above which the aircraft begins to stall.

In one preferred embodiment of the invention, calculation means 31, acquisition means 3 and processing means 5 are grouped into one single central processing unit 35 within an on-board computer (not represented) of the aircraft. In this case, calculation means 31 may comprise an algorithmic module recorded in a memory of the computer to be used by central unit 35 of the computer. More specifically, the memory of the computer may include a computer program including code instructions corresponding to the algorithmic module for using the method according to the invention, when the computer program is executed by central processing unit 35.

The system or method to assist piloting according to the invention is thus upgradable, and can easily be installed in existing aircraft, providing a low-cost, viable solution.

The algorithmic module (or calculation means 31) uses a model modelling the aircraft's lift which is prerecorded in a memory of the computer to determine in a known manner the maximum admissible angle of attack, notably as a function of the position of the high-lift means (leading edge slats, flaps, etc.), the mass of the aircraft, the speed of the aircraft relative to the air or the Mach number. It will be noted that the maximum admissible angle of attack is also used for other known piloting or flight control applications.

In addition, the algorithmic module (or calculation means 31) determines a margin of angles of attack by calculating the difference between the value of the maximum admissible angle of attack and the current value of the angle of attack measured by the angle of attack sensor (not represented). This difference is then expressed in terms of pitch angle and scaling to define the pitch angle limiting value relative to the current pitch angle value. The pitch angle limiting value is thus determined in real time, bearing in mind that it changes as the different parameters and configurations of the aircraft change.

It will be noted that in normal flight crew may at any time, and for the entire normal flight, choose whether or not to display maximum angle of attack pointer 33. However, this pointer 33 is displayed automatically as soon as the aircraft starts to enter a stall, and persists even after normal flight has been re-established, and until it is dismissed, if applicable, by the pilot.

In addition, maximum angle of attack pointer 33 and trajectory pointer 27 may be displayed in different colors, depending on whether the aircraft is in a normal flight situation, a situation of an imminent stall, or in a stall, thereby enabling the pilot to distinguish rapidly and intuitively between the different situations.

Maximum angle of attack pointer 33 and trajectory pointer 27 advantageously form upper and lower limits, respectively, of a dynamic safety envelope 37 (see FIG. 2A) representative of a normal flight of the aircraft. The dynamic envelope thus provides a margin of safety between the current pitch angle and the pitch angle limiting value. This visual margin of safety is easy to interpret, and indicates the maneuvering envelope accessible to the crew to remain in normal flight mode, and not to enter a stall. As with maximum angle of attack pointer 33, the pilot may decide to display dynamic envelope 37. Dynamic envelope 37 is displayed automatically in the event of a stall.

FIGS. 2A-2H illustrate the display of the dynamic envelope according to the invention in different flight situations.

According to these examples, dynamic envelope 37 is rectangular in shape. The upper and lower sides of the rectangle are formed by maximum angle of attack pointer 33 and trajectory pointer 27, respectively, and the sides of the rectangle enable the relationship between these two pointers to be illustrated. Of course, the relative position and/or extent of the rectangle (i.e., of dynamic envelope 37) relative to pitch scale 23 changes in real time as the flight parameters (speed, Mach number, pitch rate, etc.) and configurations (positions of flaps, leading edge slats, etc.) of the aircraft change.

In addition, dynamic envelope 37 is advantageously displayed in different colors, including a first color (for example, green) representing a normal flight situation, a second color (for example, yellow or amber) representing a situation of an imminent stall, and a third color (for example, red) representing a stall. It will be noted that the representations of an imminent stall or start of a stall of dynamic envelope 37 are made in conjunction with the acoustic or tactile alerts habitually given in these situations.

Figure 2A:
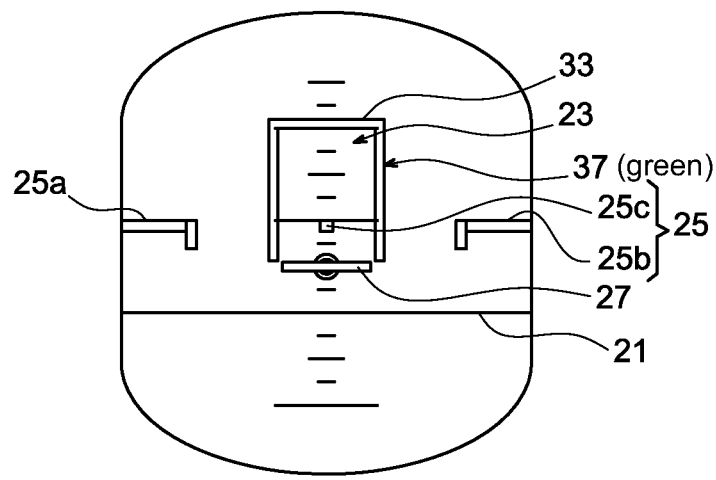
FIGS. 2A-2H illustrates schematically the display, on the display screen of the system of FIG. 1, of a dynamic envelope in different flight situations.

The example of FIG. 2A illustrates the case in which the aircraft is in a normal flight situation and in which the pilot has chosen to display dynamic envelope 37. More specifically, in this example, the lower side of the rectangle (i.e., trajectory pointer 27) is above horizon line 21, indicating that the aircraft is climbing. In addition, pitch pointer 25 (or, more accurately, its central element 25c) is indeed within dynamic rectangle 37 (colored green), and the pilot consequently has a good margin to increase the pitch angle without going outside rectangle 37. In addition, the horizontal portions of first and second elements 25a, 25b of pitch indicator 25 are parallel to horizon line 21, indicating that the roll angle is zero.

Figure 2B:
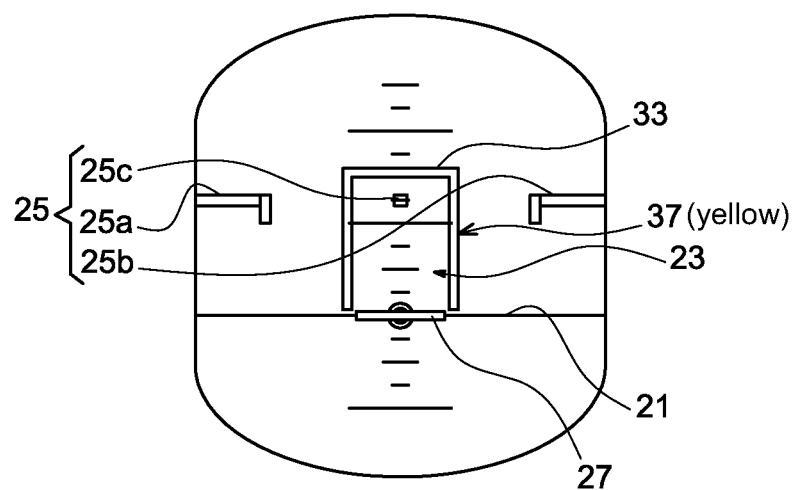

FIG. 2B illustrates the case in which the aircraft begins to enter a stall and in which dynamic envelope 37 is displayed automatically. In this example, pitch pointer 25 is close to upper side 33 of dynamic rectangle 37. In this case the angle of attack is close to the critical value, and the pilot is consequently alerted visually (dynamic rectangle 37 colored yellow) and acoustically that they should return to a normal flight situation.

Figure 2C:
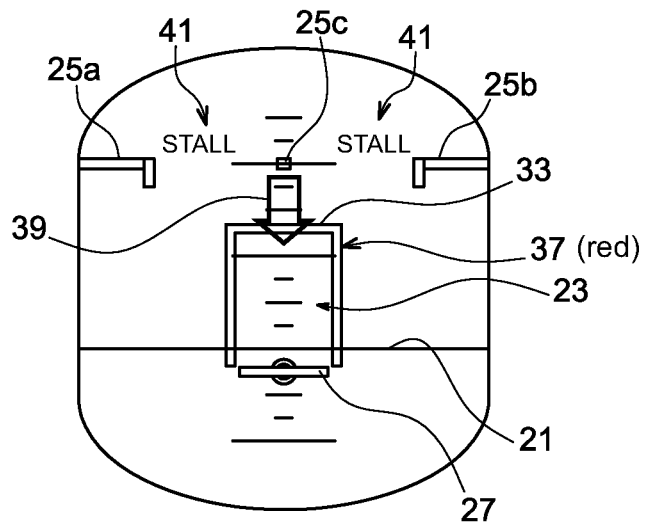

FIG. 2C illustrates the case in which the aircraft has stalled. This example shows that pitch pointer 25 (element 25c) has gone outside dynamic rectangle 37 and, consequently, the angle of attack is beyond the maximum angle of attack. In addition, the aircraft is at a low altitude, indicated by the fact that the lower side of the rectangle (i.e., trajectory pointer 27) is below horizon line 21. The pilot is then alerted more vigorously in acoustic, tactile and visual ways. The visual alert takes the form of a change of color of dynamic rectangle 37, which becomes red, and also by the display of a directional arrow 39 pointing in the direction from pitch pointer 25 towards the interior of dynamic envelope 37, encouraging the pilot to follow the habitual procedures, and in particular to reduce the angle of attack in order to return the pitch pointer (element 25c) to within rectangle 37. The visual alert may also include a flashing signal 41 of the word "stall," in order to attract the pilot's attention even more forcefully.

Figure 2D:
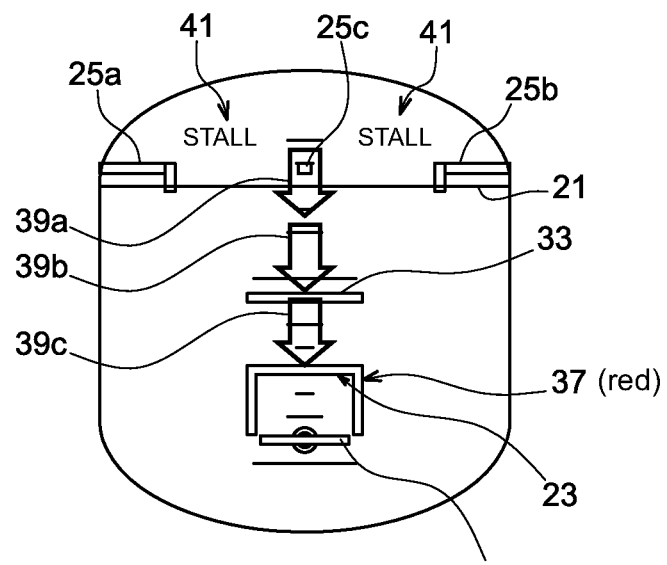

In the situation of FIG. 2D, the aircraft is in a stall with a very high angle of attack which is very far from dynamic rectangle 37, corresponding to a normal flight and, in addition, the lower side of the rectangle (i.e., trajectory pointed 27) is well below horizon line 21. The acoustic, tactile and visual alerts persist with the display of several arrows 39a, 39b, 39c pointing towards dynamic rectangle 37, encouraging the pilot still more firmly firstly to lower the angle of attack in order to come out of the stall, and then to apply more power to increase the speed and reduce the drop in altitude.

Figure 2E:
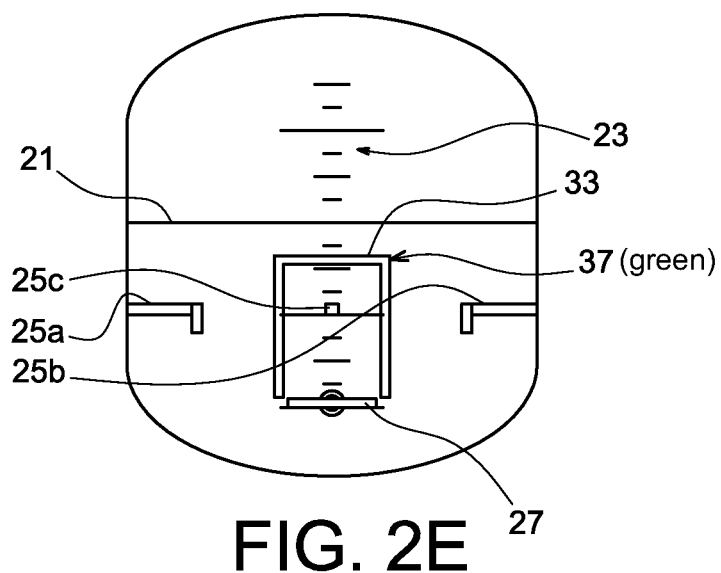

In the situation of FIG. 2E, the aircraft has come out of the stall with element 25c of pitch pointer 25 well within dynamic rectangle 37, which is once again colored green, except that the aircraft's altitude is low. The pilot nevertheless has a good pitch margin to enable the aircraft to climb again without leaving dynamic rectangle 37.

Figure 2F:
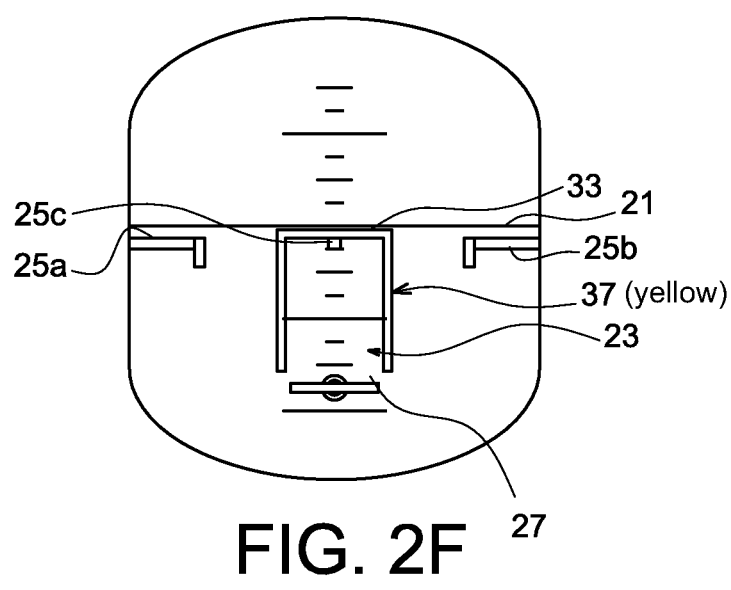

Thus, in the situation of FIG. 2F, in order to restore the altitude of the aircraft, the pitch angle has been increased, while keeping element 25c of pitch pointer 25 within dynamic rectangle 37, but just below upper side 33 of rectangle 37. This enables the pitch margin to be used to its fullest extent, while being sure that a secondary stall will not occur. Of course, due to the fact that pitch pointer 25 has become close to upper side 33 of dynamic rectangle 37, the color of rectangle 37 becomes yellow again, in order to warn the pilot not to exceed the maximum angle of attack.

Figure 2G:
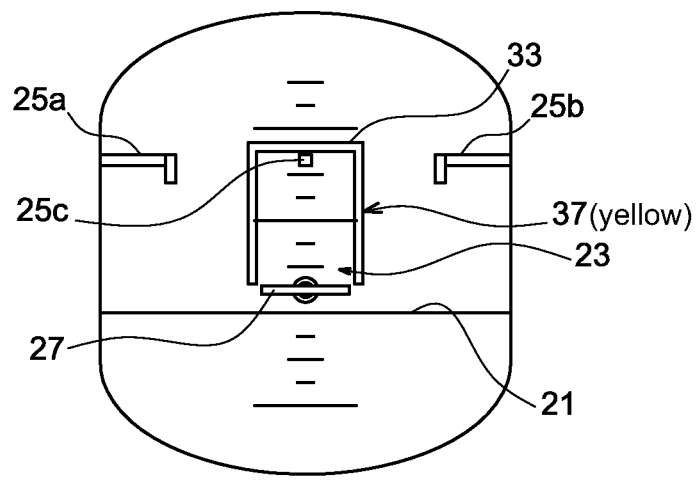

In the situation of FIG. 2G, the altitude of the aircraft has been re-established and the lower side of the rectangle (i.e., trajectory pointer 27) is above horizon line 21. However, the color of dynamic rectangle 37 remains yellow since the pitch pointer is still close to the upper side of rectangle 37 (i.e., maximum angle of attack pointer 33).

Figure 2H:
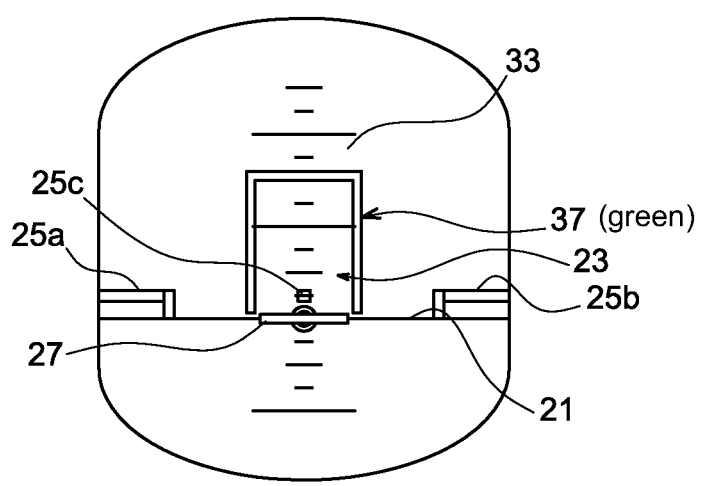

Finally, in FIG. 2H, the color of dynamic rectangle 37 becomes green again since central element 25c of pitch pointer 25 is well within rectangle 37 and the aircraft returns to a normal flight situation. The display of dynamic envelope 37 persists even after the aircraft has come out of the stall, until it is dismissed by the pilot.

The relative position of dynamic envelope 37, firstly relative to pitch pointer 25, and secondly relative to horizon line 21, thus enables an optimum performance to be achieved in a simple manner in order both to come out of a stall and to regain altitude without stalling again, while maintaining a speed appropriate to the current flight phase.

After coming out of the stall system 1 to assist piloting advantageously includes the display of roll control signals to re-establish the aircraft's lateral stability.

Figure 3A:
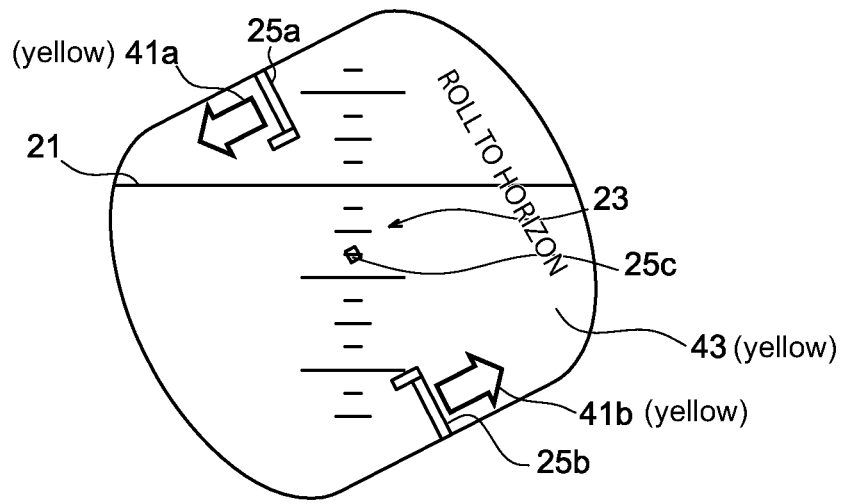
FIGS. 3A-3C illustrate schematically the display on the display screen of roll control signals to guide the crew with the roll movements, according to the invention.
Figure 3B:
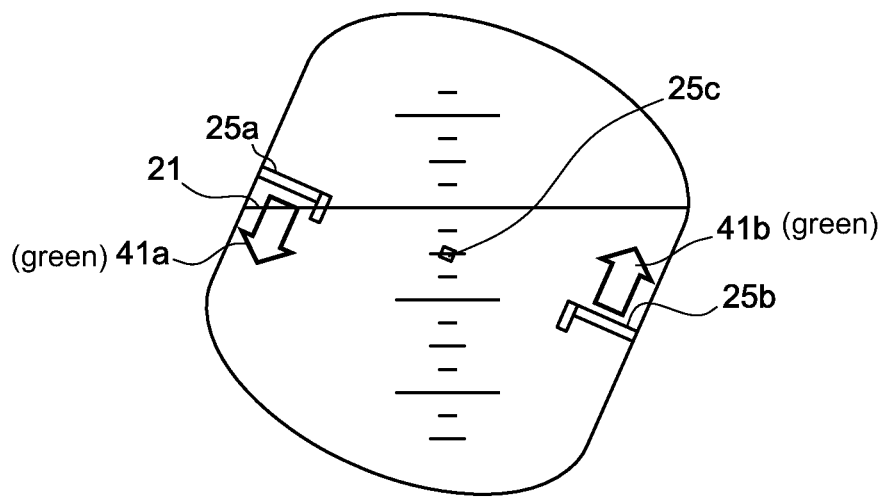
Figure 3C:
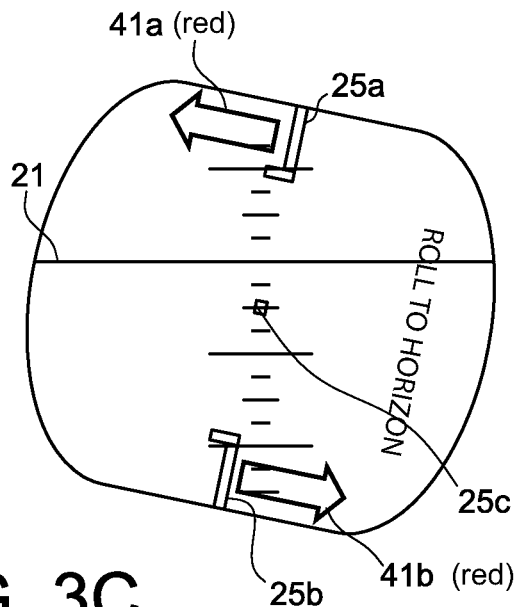

Indeed, FIGS. 3A-3C illustrate the display of roll control signals to guide the crew in roll motions, according to the invention.

The roll control signals advantageously include arrows 41a, 41b shown in different colors and/or sizes, and which may be flashing, depending on whether the operation to return to horizontal flight is accomplished in the correct or the incorrect direction.

In this case, the intention is to give the pilot clear and accurate indications in order to guide him to make a roll motion in the correct direction towards artificial horizon 21 after the aircraft has come out of a stall. In other words, the roll control signals are not displayed while the aircraft is in a stall, or is about to enter a stall, but conversely they are automatically displayed after the aircraft has come out of these stall situations, i.e., when pitch pointer 25c is within dynamic envelope 37. In addition, after the aircraft has come out of a stall the roll control signals can also be displayed to re-establish a lateral stability of the aircraft.

FIG. 3A illustrates the case in which the aircraft has come out of the stall, but in which the horizontal portions of first and second elements 25a, 25b of pitch pointer 25 are not parallel to horizon line 21. The roll control signals are then automatically displayed at this time to assist the pilot to make a roll motion in the correct direction. In particular, two arrows 41a, 41b are displayed in the area of first and second elements 25a, 25b of pitch pointer 25. Indeed, first and second arrows 41a, 41b are applied in opposite directions in the horizontal portions of first and second elements 25a, 25b respectively of pitch pointer 25, thus representing a rotational torque around central element 25c of pointer 25. In addition, the roll control signals may also include a flashing signal 43 of the words "roll to horizon." The two arrows 41a, 41b and flashing signal 43 are initially colored yellow to attract the pilot's attention.

FIG. 3B shows that when the action undertaken by the pilot coincides with the roll control signals the color of first and second arrows 41a, 41b becomes green again, in order to encourage the pilot in his action, indicating to him that the roll motion is occurring in the correct direction.

Conversely, FIG. 3C shows that when the roll motion initially accomplished by the pilot is in the incorrect direction the size of first and second arrows 41a, 41b increases, to attract the pilot's attention in order that he rectifies his action. In addition, if the pilot persists in going in the incorrect direction, arrows 41a, 41b start to flash and become red, to attract the pilot's attention still further.

In addition, system 1 to assist piloting advantageously includes the display of a "BUSS" (Back-Up Speed Scale).

Figure 4:
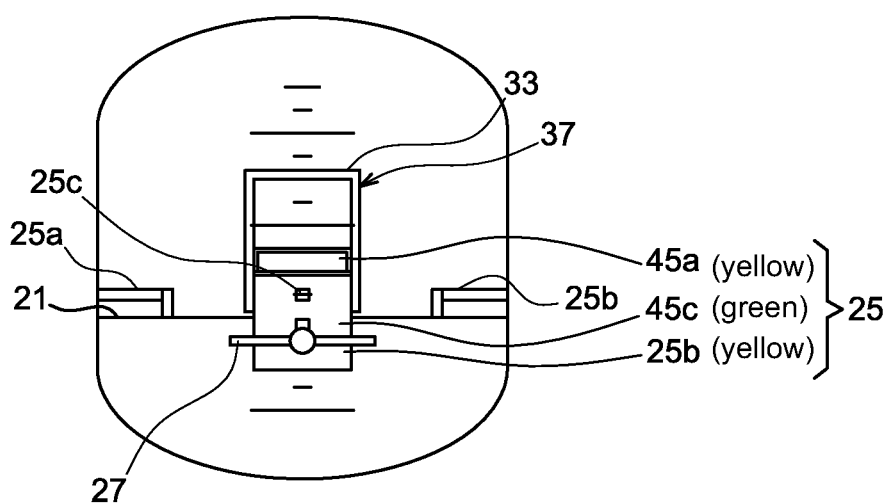
FIG. 4 illustrates schematically the display on the display screen of a BUSS according to the invention.

Indeed, FIG. 4 illustrates the display of a BUSS on the display screen, according to the invention.

Thus, in the event of a malfunction or of erroneous data of the habitual speed indicator (not represented), a colored scale strip 45 is displayed in the same location as dynamic rectangle 37. In this case, trajectory pointer 27 is used to read the color representing the speed of the aircraft.

Indeed, colored scale strip 45 is used to replace the normal speed scale by a scale of colors determined from the angle of attack measured by the very robust angle of attack sensor. Colored speed scale strip 45 has, for example, the same width as dynamic rectangle 37, and includes a green central area 45a representing a normal speed of the aircraft, edged with first upper area 45b and lower area 45c of yellow warning color, which can in their turn be edged with second upper and lower areas (not represented) which are red in color, representing an abnormal speed. Colored speed strip 45 thus encourages the pilot to remain within green central area 45a in order to fly in complete safety.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method to assist piloting of an aircraft, according to which a trajectory pointer representing a current flight trajectory vector and a pitch pointer indicating a current pitch angle value are shown on a pitch scale of a display screen, including the following steps: determining a pitch angle limiting value representative of a maximum admissible angle of attack, depending on a set of flight parameters and aircraft configurations, and displaying on the pitch scale of the display screen a maximum angle of attack pointer indicating the pitch angle limiting value and a dynamic safety envelope indicator, wherein the dynamic safety envelope indicator includes a graphical representation such that the maximum angle of attack pointer and trajectory pointer form upper and lower limits, respectively, with two vertical lines, each vertical line extending from an end of the maximum angle of attack pointer toward the trajectory pointer and the dynamic safety envelope being representative of a normal flight of the aircraft; wherein the display of one of the maximum angle of attack pointer and the said dynamic safety envelope indicator is shown using different colors, including a first color representing a normal flight situation, a second color representing a situation where a stall is imminent, and a third color representing a stall.

2. A method according to claim 1, wherein at least one of the relative position and extent of the dynamic safety envelope indicator relative to the pitch scale change as the flight parameters and configurations of the aircraft change.

3. A method according to claim 2, wherein the flight parameters include the Mach number and the pitch rate.

4. A method according to claim 1, wherein one of the maximum angle of attack pointer and the dynamic safety envelope indicator are displayed automatically as soon as the aircraft enters a stall.

5. A method according to claim 1, wherein in normal flight one of the maximum angle of attack pointer and the dynamic safety envelope indicator is displayed at the pilot's request.

6. A method according to claim 1 wherein the stall is accompanied by a display of directional arrows pointing in the direction from the pitch pointer towards the interior of the said dynamic safety envelope indicator.

7. A method according to claim 1, wherein one of the maximum angle of attack pointer and of the dynamic safety envelope indicator remains displayed after coming out of the stall, until the pilot decides to no longer display it.

8. A method according to claim 1, further including displaying roll control signals to re-establish the lateral stability of the aircraft one of after the aircraft comes out of the stall, and when the aircraft is not in a stall.

9. A method according to claim 1, further including displaying on the display screen a replacement speed scale in the event of a malfunction of a habitual speed indicator.

10. A system to assist piloting of an aircraft, including a display screen showing a pitch scale, where a trajectory pointer represents a current flight trajectory vector and a pitch pointer indicating a current pitch angle value, comprising: an algorithmic module to determine a pitch angle limiting value representative of a maximum admissible angle of attack, depending on a set of flight parameters and aircraft configurations, and the algorithmic module to display on the said pitch scale of the display screen a maximum angle of attack pointer indicating the said pitch angle limiting value and dynamic safety envelope indicator, wherein the dynamic safety envelope indicator includes a graphical representation such that the maximum angle of attack pointer and trajectory pointer form upper and lower limits, respectively, with two vertical lines, each vertical line extending from an end of the maximum angle of attack pointer toward the trajectory pointer and the dynamic safety envelope being representative of a normal flight of the aircraft; wherein the display of one of the maximum angle of attack pointer and the said dynamic safety envelope indicator is shown using different colors, including a first color representing a normal flight situation, a second color representing a situation where a stall is imminent, and a third color representing a stall.

11. An aircraft including a system to assist piloting according to claim 10.

* * * * *